No. 617,991. Patented Jan. 17, 1899.
J. B. McDILL.
MOVABLE IRRIGATING FLUME.
(Application filed Feb. 15, 1898.)
(No Model.)
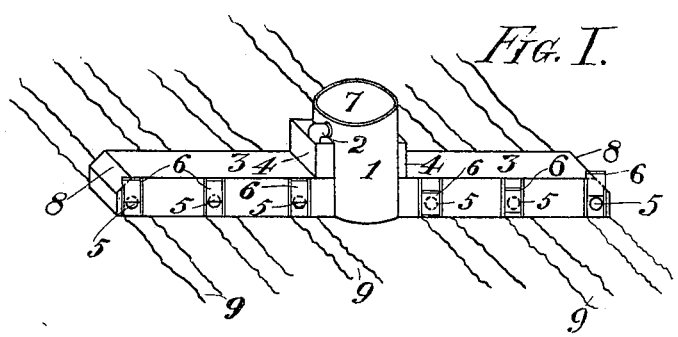
Fig. I.
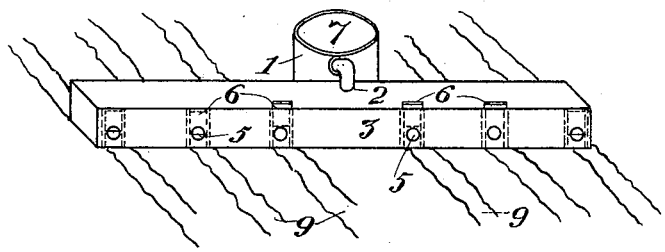
Fig. II.
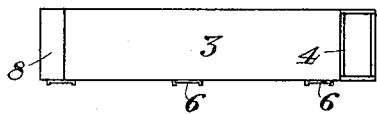
Fig. III.
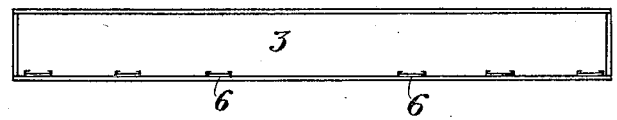
Fig. IV.
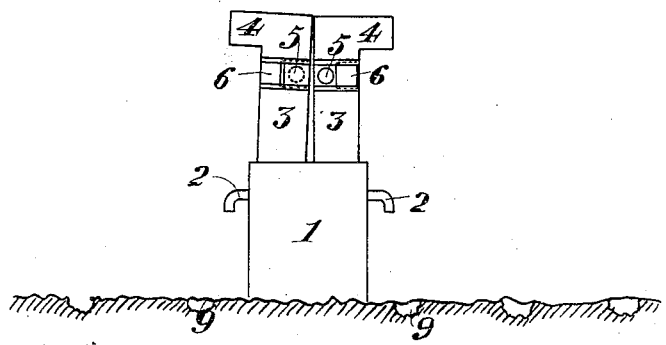
Fig. V.
Witnesses:
Ernest R. Greeth
Ray Allen
Inventor:
J. B. McDill
by Wright Bros.
Attorneys.
THE NORRIS PETERS CO., PHOTO-LITHO., WASHINGTON, D. C.

UNITED STATES PATENT OFFICE.

JAMES B. McDILL, OF SOUTH PASADENA, CALIFORNIA.

MOVABLE IRRIGATING-FLUME.

SPECIFICATION forming part of Letters Patent No. 617,991, dated January 17, 1899.

Application filed February 15, 1898. Serial No. 670,414. (No model.)

*To all whom it may concern:*

Be it known that I, JAMES B. MCDILL, a citizen of the United States, residing at South Pasadena, in the county of Los Angeles and State of California, have invented certain new and useful Improvements in Movable Irrigating-Flumes, of which the following is a full, clear, and exact description, reference being had to the accompanying drawings, which form a part of this specification.

My invention relates to improvements in irrigating-flumes whereby the same are removable, so as to be placed out of the way while the ground is being cultivated, &c., and whereby I obtain advantages impossible where a fixed flume is used; and my invention consists in features of novelty hereinafter claimed.

Figure I is a perspective view showing my improved movable flume in two sections. Fig. II is a modification showing the flume in one section. Fig. III is a plan view of the form shown in Fig. I. Fig. IV is a plan view of the form shown in Fig. II. Fig. V is a front elevation of the stand-pipe and the movable flumes placed in the stand-pipe as a convenient receptacle for the same when they are not in use.

Referring to the drawings, 1 represents a vertical stand-pipe, which is connected by a supply-pipe generally placed beneath the surface of the ground and controlled by suitable valves, whereby the water may be permitted to flow and pass out through the stand-pipe. 2 represents discharge-pipes connected with the stand-pipes, through which the water is discharged.

3 represents my improved removable flume, the form shown in Fig. I being inclosed on all sides and having elbows 4, open at their upper ends, through which the water from the discharge-pipes 2 passes, the water passing into the flume and being distributed therefrom through a series of orifices 5, said orifices being controlled by a series of movable gates or slides 6, by which means the amount of water passing any one orifice may be controlled or the orifices shut off entirely, if so desired.

In the form of flume shown in Fig. I it will operate successfully even if the ground is not level, as the flume being inclosed the water cannot flow out at the top of the same. The form shown in Fig. II is adapted for a level surface, where there is no tendency for the water to flow mainly to either end of the flume. In this latter form I have preferably shown the slides 6 on the inside of the flume. The stand-pipe 1 is open at the top, as shown at 7, and when the flume is not in use it may be placed within the same, as shown in Fig. V, in order to hold it out of the way of the cultivator and to protect it from injury, decay, &c.

In the form shown in Fig. I, I prefer to bevel off the upper outer corners, as shown at 8, so that when the two sections of flume are placed back to back and placed in the stand-pipe, as shown in Fig. I, the corners will not project to prevent a ready passage of the flume into the stand-pipe.

There are many advantages in my improved removable flume over a fixed flume, a few of which are as follows: Less length of flume is required. When the flume is not in use, it can be placed out of the way of danger of the team in cultivating and otherwise preserved by placing it in the stand-pipe. By the removal of the flume the furrows 9 may be cultivated up to the flume, so that when the water is turned on no shoveling is required to have the water pass into the furrows. By the removal of the flume the ground may be more thoroughly cultivated, permitting the team to travel farther than where a stationary flume is used, another advantage being that during the season when the flume is not in use it may be readily stacked away and protected from the elements, there being numerous other advantages not necessary to mention in this application, but which are obvious to persons familiar with irrigating.

The stand-pipes generally are placed opposite each of the rows of trees in the orchard, and the flume discharges the water into the furrows formed on each side of the trees. It is obvious, however, that the flume may be used for irrigating other products or vegetation.

I claim as my invention—

1. As a new article of manufacture, a movable flume having its top inclosed, having distributing-orifices and an elbow through which water may pass to the flume, substantially as set forth.

2. In an irrigating-flume the combination of inclosed movable sections, discharge-orifices leading from the flume, a series of slides for controlling said orifices and elbows on said flume-sections having their upper ends open for the passage of water, substantially as set forth.

The foregoing specification signed at Los Angeles this 7th day of February, 1898.

JAMES B. McDILL.

In presence of—
EMMET H. WILSON,
JAS. E. KNIGHT.